(12) United States Patent
Matysiak

(10) Patent No.: US 7,547,096 B2
(45) Date of Patent: Jun. 16, 2009

(54) APPARATUS AND METHODS OF DEPOSITING FLUID

(75) Inventor: Stefan M. Matysiak, Montara, CA (US)

(73) Assignee: Applied Biosystems, LLC, Carlsbad, CA (US)

(*) Notice: Subject to any disclaimer, the term of this patent is extended or adjusted under 35 U.S.C. 154(b) by 240 days.

(21) Appl. No.: 11/027,817

(22) Filed: Dec. 29, 2004

(65) Prior Publication Data

US 2005/0190243 A1 Sep. 1, 2005

Related U.S. Application Data

(60) Provisional application No. 60/533,783, filed on Dec. 30, 2003.

(51) Int. Cl.
*B41J 2/175* (2006.01)
*B41J 2/17* (2006.01)

(52) U.S. Cl. ............... 347/85; 347/86; 347/84

(58) Field of Classification Search .......... 347/85, 347/86, 84
See application file for complete search history.

(56) References Cited

U.S. PATENT DOCUMENTS

| | | | |
|---|---|---|---|
| 3,334,354 A | | 8/1967 | Mutschler |
| 3,582,954 A | * | 6/1971 | Skala .................... 347/52 |
| 4,136,346 A | * | 1/1979 | Parkinson ............... 347/39 |
| 5,781,212 A | * | 7/1998 | Burr et al. ............... 347/84 |
| 6,467,700 B2 | | 10/2002 | Vann et al. |
| 6,866,825 B2 | * | 3/2005 | Chiou et al. ........... 422/100 |
| 2002/0164824 A1 | * | 11/2002 | Xiao et al. ............. 436/524 |
| 2002/0176801 A1 | * | 11/2002 | Giebeler et al. ...... 422/82.05 |
| 2003/0025758 A1 | | 2/2003 | Silverbrook |
| 2003/0108451 A1 | * | 6/2003 | Su et al. ............... 422/100 |
| 2003/0169315 A1 | | 9/2003 | Pickrell |
| 2003/0205200 A1 | | 11/2003 | Vann et al. |
| 2003/0223796 A1 | | 12/2003 | Barth et al. |

FOREIGN PATENT DOCUMENTS

| | | |
|---|---|---|
| EP | 0443628 A2 | 8/1991 |
| EP | 1127692 A2 | 8/2001 |
| JP | 61084254 | 4/1986 |
| JP | 61089856 A | 5/1986 |

OTHER PUBLICATIONS

Notification of Transmittal of the International Search Report and the Written Opinion of the International Searching Authority, or the Declaration for PCT Application No. PCT/US2004/041409, mailed May 4, 2005.
International Search Report for PCT Application No. PCT/US2004/041409, mailed May 4, 2005.
Written Opinion of the International Searching Authority for PCT Application No. PCT/US2004/041409, mailed May 4, 2005.

* cited by examiner

*Primary Examiner*—Stephen D Meier
*Assistant Examiner*—Sarah Al-Hashimi

(57) ABSTRACT

Apparatus comprising a plurality of channels and a plurality of deposition units and methods for depositing fluids on a support are disclosed.

34 Claims, 7 Drawing Sheets

APPARATUS AND METHODS OF DEPOSITING FLUID

This application claims the benefit of U.S. Provisional Application No. 60/533,783 filed Dec. 30, 2003, which is incorporated by reference herein in its entirety.

Printing manifolds for depositing fluid on a support are provided comprising a plurality of adjoining plates, each plate comprising a first surface, a second surface, and a plurality of channels, wherein each channel intersects the first and second surfaces, and a plurality of deposition units, wherein each deposition unit is disposed within a different channel of the plurality of channels such that each deposition unit is configured to move fluid from the channel with which the deposition unit is associated through the second surface of one of the plates.

Printing manifolds for depositing fluid on a support are provided comprising at least one plate comprising a first surface, a second surface, and a plurality of channels, wherein each channel intersects the first and second surfaces, a plurality of capillary tubes, each capillary tube being disposed within a different channel of the plurality of channels; and a plurality of deposition units, each deposition unit being disposed within a different capillary tube of the plurality of capillary tubes such that each deposition unit is configured to move fluid from the capillary tube with which the deposition unit is associated through the second surface of one of the plates.

Apparatus are provided comprising a printing manifold comprising a plurality of adjoining plates, each plate comprising a first surface, a second surface, and a plurality of channels, wherein each channel intersects the first and second surfaces, and a plurality of deposition units, wherein each deposition unit is disposed within a different channel of the plurality of channels such that each deposition unit is configured to move fluid from the channel with which the deposition unit is associated through the second surface of one of the plates, and at least one mechanism configured to move at least one of the deposition units.

Method are provided comprising providing a fluid to at least one of a plurality of channels in an apparatus comprising a printing manifold comprising (i) a plurality of adjoining plates, each plate comprising a first surface, a second surface, and a plurality of channels, wherein each channel intersects the first and second surfaces, and (ii) a plurality of deposition units, wherein each deposition unit is disposed within a different channel of the plurality of channels such that each deposition unit is configured to move fluid from the channel with which the deposition unit is associated through the second surface of one of the plates, and moving at least one of the plurality of deposition units associated with a channel comprising the fluid to deposit fluid on the support.

These and other features of the present disclosure are set forth herein.

DESCRIPTION OF THE DRAWINGS

The skilled artisan will understand that the drawings, described below, are for illustration purposes only. The drawings are not intended to limit the scope of the present teachings in any way.

Unless otherwise indicated, all numbers expressing dimensions, tolerances, and so forth used in the specification and claims are to be understood as being modified in all instances by the term "about". Accordingly, unless indicated to the contrary, the numerical parameters set forth herein are approximations that may vary depending upon the desired properties to be obtained.

In this application, the use of the singular includes the plural unless specifically stated otherwise. In this application, the use of "or" means "and/or" unless stated otherwise. Furthermore, the use of the term "including", as well as other forms, such as "includes" and "included," is not limiting. Also, terms such as "element" or "component" encompass both elements and components comprising one unit and elements and components that comprise more than one subunit unless specifically stated otherwise.

The section headings used herein are for organizational purposes only, and are not to be construed as limiting the subject matter described.

DESCRIPTION OF VARIOUS EMBODIMENTS

In certain embodiments, an apparatus is provided for depositing fluid onto a support comprising a printing manifold comprising at least one plate comprising a plurality of channels and a plurality of deposition units, each of the plurality of deposition units being associated with one of the channels, and at least one mechanism for moving the deposition units.

Figure 1:
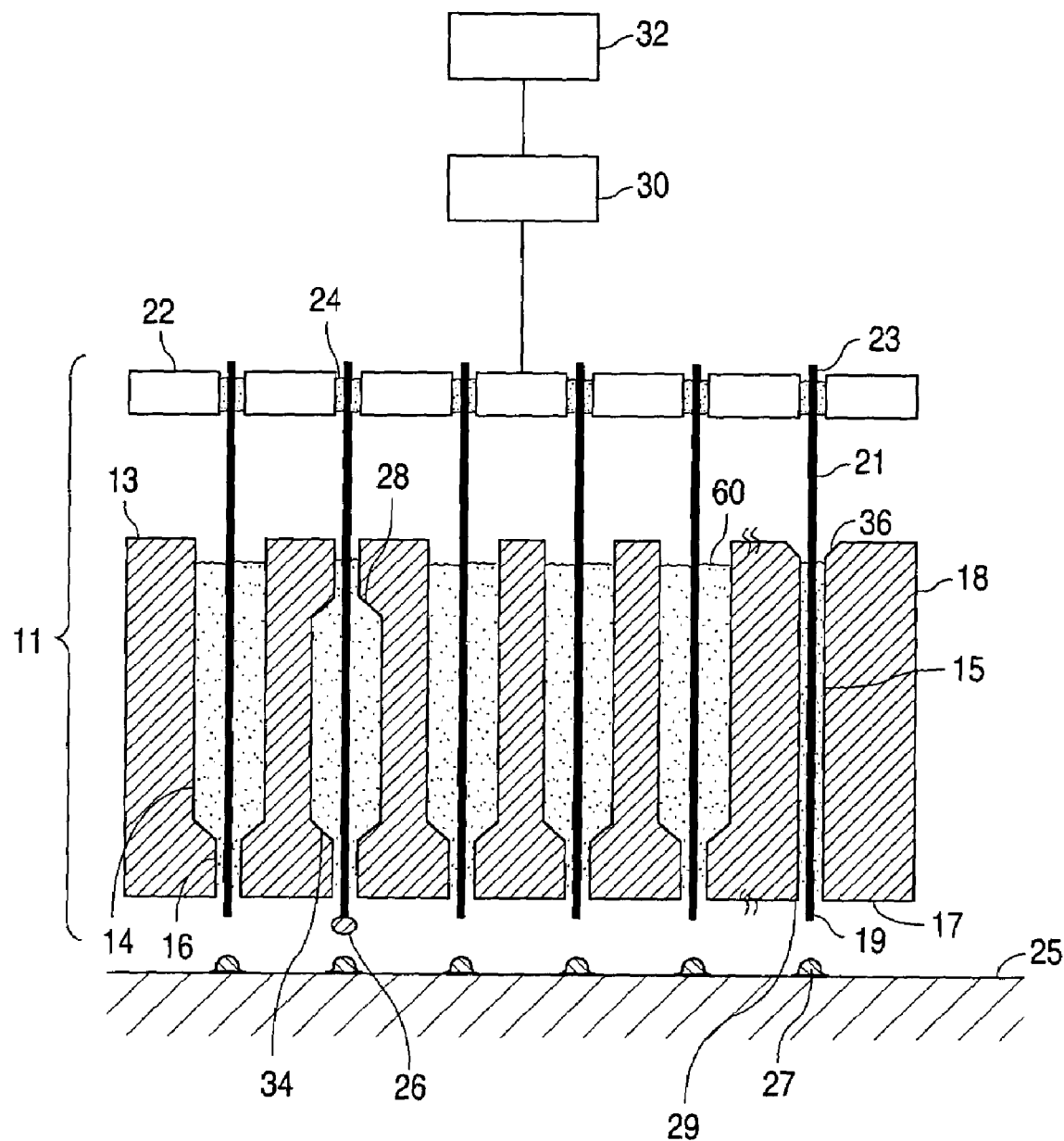
FIG. 1 is a schematic illustration of an apparatus for depositing fluid onto a support including a cross-sectional view of a plate according to certain embodiments.

Certain embodiments provide an apparatus for depositing fluid. Certain embodiments of apparatus are illustrated in FIG. 1. FIG. 1 shows a cross-sectional view through a plate 18. Certain channels 15 can include the same dimension throughout the length of the channel. In certain embodiments, channels 15 can comprise a reservoir channel 14 and a printing channel 16. In certain embodiments, channels 15 can comprise regions having different dimensions. As shown, a deposition unit 21 can be disposed within each of channels 15. Deposition units 21 can be mechanically coupled through device 22 to a mechanism 30 configured to move deposition units 21.

Figure 2:
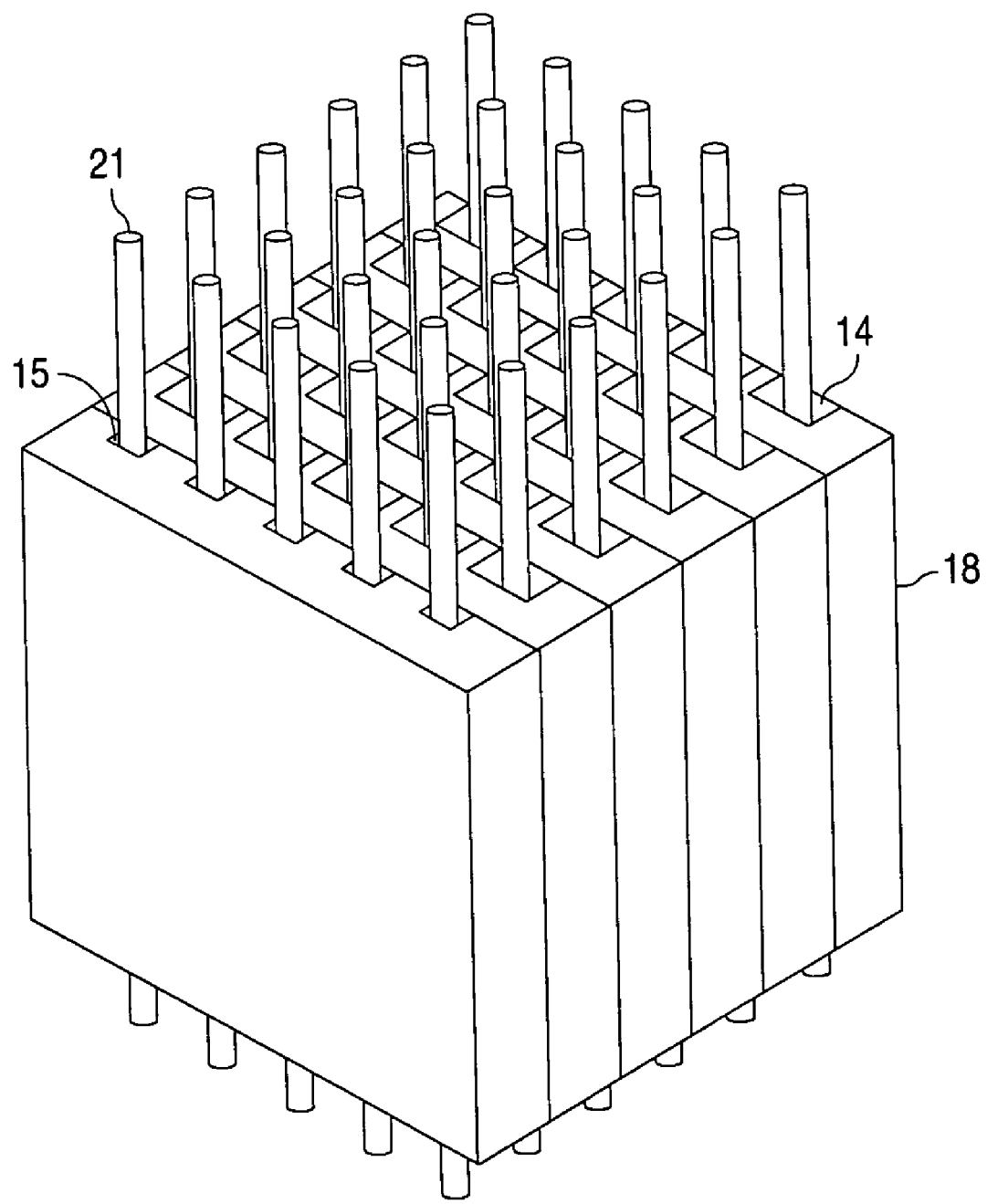
FIG. 2 is a schematic illustration of a printing manifold according to certain embodiments.

As illustrated in FIG. 2, in certain embodiments, an apparatus for depositing fluid can comprise a plurality of plates 18, each plate 18 comprising a plurality of channels 15 and a plurality of deposition units 21, each of plurality of deposition units 21 being associated with one of plurality of channels 14 and 15.

In certain embodiments, an example of using an apparatus illustrated in FIG. 1 for depositing fluid onto a support, e.g., printing, can be described as follows. A fluid 60 comprising for example, oligonucleotides, is provided to at least one channel 15. Deposition unit 21 can be inserted into channel 15 before or after fluid 60 is provided to at least one channel 15. The dimensions of deposition unit 21 and the proximate end 29 of channel 15 or printing channel 16 can be dimensioned to prevent or minimize the flow of fluid 60 in the absence of moving deposition unit 21. The distal end 23 of deposition unit 21 can be coupled to mechanism 30 configured to move the deposition unit 21. Mechanism 30, configured to move as disclosed herein, can axially position deposition unit 21 within channel 15. A substrate 25 can be positioned with respect to deposition units 21. Mechanism 30 configured to move can then move deposition units 21 beyond proximate surface 17 of plate 18. In certain embodiments, deposition units 21 can be coupled to a mechanism 32 configured to oscillate deposition units 21 such that deposition units 21 can be oscillated during at least a part of the printing process. In certain embodiments, a mechanism configured to move at least one deposition unit and a mechanism configured to oscillate at least one deposition unit can be the same mechanism. The proximate ends 19 of deposition units 21 can retain fluid 26 transferred from fluid 60 within channel 15, printing channel 16, and/or reservoir channel 14. Mechanism 30 configured to move can longitudinally extend deposition units 21 to contact or nearly contact support 25. Deposition units 21 can then be withdrawn from support 25 to leave fluid areas 27 deposited on support 25. Mechanism 30 configured to move can withdraw deposition units 21 within channels 15 such that flow of fluid 60 through proximate channel end 29 is prevented or minimized when deposition units 21 are not moving. Subsequent fluid areas 27 can be deposited on support 25 by repositioning support 25, or subsequent fluid areas 27 can be deposited onto a different area of support 25 or onto a new support (not shown) by positioning support 25 or the new support with respect to the deposition units.

In certain embodiments, the apparatus and methods facilitate repeated deposition of fluid areas onto one or more supports without having to load the proximate end of the deposition units with fluid from a remote fluid reservoir between each printing step. In certain embodiments, the channels in which the deposition units are disposed provide reservoirs of fluid that fill the proximate end of the deposition unit between each fluid printing step. In certain embodiments wherein the apparatus as a whole is not moved between each printing step, the deposition or printing of a large number of fluid areas can be facilitated.

Certain embodiments of an apparatus are schematically illustrated in FIG. 1. FIG. 1 shows a cross-sectional view through an embodiment of a single plate 18 having a plurality of channels 15. As shown, the apparatus illustrated in FIG. 1 can comprise a printing manifold 11 and a mechanism 30 configured to move at least one deposition unit 21. Printing manifold 11 can comprise at least one plate 18 comprising a plurality of channels 15. In certain embodiments, printing manifold 11 can comprise a plurality of plates.

A printing manifold can comprise a plurality of plates, including, for example, from 2 to 100 plates. The multiple plates can be the same or different. For example, the multiple plates, can be formed from the same or different materials, can have the same or different dimensions, can have the same or different shape, can include the same or different physical, chemical, and/or electrical features, and/or can include the same or different pattern and dimension of channels.

A plate can be fabricated from any appropriate material. For example, suitable materials can include, but are not limited to, those that are amenable to low cost manufacturing such as glass, silica, polymer, metal, ceramic, and silicon. In certain embodiments, materials used to form a plate can include additives such as dopants and fillers, and/or can comprise a composite material. In certain embodiments, a material forming a plate can be modified to enable and/or optimize certain chemical, physical, or electrical properties as appropriate for a particular application. For example, in certain embodiments, surface modification can be used to alter a chemical activity of the plate surface, the polarity of the plate surface, and/or the surface tension of a fluid on the plate surface. In certain embodiments, surface modification can include organic or inorganic treatment, such as silane treatment.

The dimensions of each plate can be any dimension appropriate for a particular application. For example, to accommodate the dimensions of certain microarrays, in certain embodiments, the width of a plate can range from 1 to 5 inches. The width of a plate refers to the dimension perpendicular to the longitudinal axis of the plurality of channels. In certain embodiments, the thickness of a plate can at least in part be determined by the separation between the fluid areas to be deposited on a support. For providing a regular array of fluid areas on a support, in certain embodiments it can be useful that the thickness of a plate be equal to the separation between deposited fluid areas. As an example, in certain embodiments, for a regular array of fluid areas having a nearest neighbor separation of 1,000 µm, it can be desirable that the thickness of a plate be 1,000 µm. In certain embodiments, the thickness of a plate can range from 200 µm to 10,000 µm.

The height of a plate can be any appropriate height suitable for a particular application. The height of plate refers to the dimension parallel to the longitudinal axis of the plurality of channels. In certain embodiments, wherein a channel can also serve as a fluid reservoir, the appropriate height of a plate can at least in part be determined by the volume of fluid to be retained within the reservoir. Thus, in certain embodiments, a large plate height can be used to form a large reservoir and the retention of a greater volume of fluid.

In certain embodiments, a plate can comprise a plurality of channels. Channels can be formed on a single side of the plate, on both sides of a plate, and/or within a plate. The channels can extend from a first surface of a plate to a second surface of a plate. Channels can be formed in and/or on a plate by known fabrication techniques as appropriate for the material comprising the plate and the dimensions and tolerance considerations of the channels. Thus, for example, in certain embodiments, lithographic/semiconductor processing methods can be used to form channels in a plate comprising glass, silica or silicon materials. In certain embodiments, channels can be formed in a plate comprising metallic materials using mechanical, chemical, electro-discharge machining (EDM) methods, and the like. In certain embodiments, wherein a plate comprises a polymer material, channels can be formed using injection molding, extrusion, compression molding, thermoforming, and the like.

In certain embodiments, a plate can include any appropriate number of channels. Practical considerations for determining an appropriate number of channels according to certain embodiments can include the cost of manufacturing the plate, the ease of manipulating the deposition units associated with the channels, and/or the density of fluid areas to be deposited on a support. For example, in certain embodiments, a plate can include from 10 to 100 channels.

In certain embodiments, as shown in FIG. 1, channels 15 can extend from distal surface 13 to proximate surface 17 of plate 18. As used herein, proximate plate surface 17 and proximate printing unit end 19 refer to the surface or end, which, during operation, is nearest the support onto which fluid is deposited. As used herein, distal plate surface 13 and distal printing unit end 23 refer to the surface or end opposite the proximate surface or end.

In certain embodiments, the separation between nearest channels can at least in part be determined by the separation between adjacent fluid areas to be deposited on a support. In certain embodiments, the center-to-center distance between nearest channels can range from 200 µm to 10,000 µm. In certain embodiments, the center-to-center distance between nearest channels can range from 500 µm to 2,000 µm.

In certain embodiments, channels can be dimensioned to prevent or reduce fluid flow through the channel in the absence of moving the deposition unit associated with the channel. In certain embodiments, fluid flow through a channel in the absence of moving the deposition unit can be prevented or reduced when, for example, capillary and/or surface tension forces between the fluid within the channel and the sides of the channel and the deposition unit at the proximate end of the channel overcome gravitational forces. In certain embodiments, the balance of forces influencing fluid flow through a channel can at least in part be determined by the distance separating the outer surface of a deposition unit and the sidewall of a channel at the proximate end of the deposition unit. In certain embodiments, the distance between the outer surface of a deposition unit and the sidewall of a channel can range from 0.5 µm to 50 µm. In certain embodiments, the distance between the outer surface of a deposition unit and the sidewall of a channel can be less than 25 µm. When the dimensions of both the deposition unit and the channel are round, in certain embodiments, the diameter of a channel can range from 10 µm to 100 µm greater than the diameter of the deposition unit with which the channel is associated. In certain embodiments, factors that can influence fluid flow through a channel include, for example, the viscosity of the fluid, as well as the physical, chemical, and/or electrical properties of the surfaces of the channel and the deposition unit.

In certain embodiments, as shown in FIG. 1, the distal end of a channel can include a taper 36 or other such feature to facilitate loading or insertion of a deposition unit into the channel.

In certain embodiments, a channel can comprise a reservoir channel and a printing channel. In certain embodiments, a reservoir channel can provide an additional volume in which fluid can be retained. A reservoir channel can be useful for repeated fluid deposition such as to deposit a large number of fluid areas onto one or more supports. For example, as shown in FIG. 1, reservoir channel 14 can be located toward distal plate surface 13 of plate 18. In certain embodiments, an internal reservoir channel 28 can be located between distal plate surface 13 and the proximate plate surface 17, with channel 15 being narrow at the intersection of both the distal plate surface 13 and the proximate plate surface 17. In certain embodiments, the dimensions of reservoir channel 14 can be any appropriate dimensions as useful to retain a volume of fluid and to accommodate the number of deposited fluid areas.

In certain embodiments, the contour of the transition 34 from a reservoir channel to a printing channel can, for example, be curved, tapered, or the like, as shown in FIG. 1, to facilitate the insertion of deposition unit 21 through channel 15.

In certain embodiments, the proximate surface of a plate can comprise surface features or surface modifications to facilitate controlling the deposition of fluid onto a support. For example, the proximate surface of a plate can include raised and/or recessed features and/or the hydrophobic/hydrophilic nature of the surface can be modified. In certain embodiments, a channel or a printing channel at or near a proximate edge can include raised or recessed surface features to control or influence, for example, the flow of fluid through the channel, and/or the volume of fluid deposited on a support. In certain embodiments, the sidewalls of a channel at or near the proximate end can be modified to impart useful chemical, electrical, and/or physical properties.

In certain embodiments, the contours of a printing channel and a reservoir channel can be any appropriate shape including, for example, rounded, oval, square or rectangular.

In certain embodiments, such as where a printing manifold includes multiple plates, the multiple plates can be attached using methods known in the mechanical arts such as adhesion, mechanical framing, anodic bonding, and electrostatic bonding. In certain embodiments, assembly of the multiple plates can be facilitated by incorporating alignment elements such as through-holes, recessed features, and/or raised features in or on a surface of the multiple plates.

In certain embodiments, a plate can comprise features to enhance bonding to adjoining plates. For example, to enhance adhesive bonding to an adjoining plate, a plate can include at least one groove configured to retain an adhesive. In certain embodiments, features can be included on the surface of a plate to create a fluid seal between adjacent channels. For example a surface of a plate can include a series of grooves and/or raised features designed to mate with an adjacent plate. In certain embodiments, the surface of a plate can be treated to enhance adhesion, bonding, and/or attachment to an adjoining plate. In certain embodiments, a plate can include a gasket between adjoining channels, and as such the plate can include features to retain a gasket material.

In certain embodiments, an apparatus can include a plurality of deposition units, such that a single deposition unit can be disposed within each channel. In certain embodiments, when a deposition unit is moved by a mechanism configured to move the deposition unit, the deposition unit moves fluid from the fluid channel with which it is associated to a support. In certain embodiments, deposition units can extend beyond the distal surface of a plate, for example, to facilitate handling and to operationally connect the deposition unit to a mechanism configured to move and/or a mechanism configured to oscillate the deposition units.

In certain embodiments, a deposition unit can be formed from any suitable material including, for example, silica, metal, and polymers. Examples of material structures suitable for the deposition units can include, but are not limited to, glass fiber, silica fiber, e.g. optical fiber, polymer fiber, e.g. polymer filament and polymer optical fiber, and metal wire.

In certain embodiments, a surface or portion of a surface of a deposition unit can be physically, chemically, and/or electrically modified. For example, a deposition unit can include a surface coating to modify or optimize the physical properties of the deposition unit and/or to prevent or reduce chemical degradation. In certain embodiments, a multi-layer coating, including, but not limited to, polyimide and acrylate coatings, can be used to modify or optimize the physical properties, mechanical properties, and/or prevent chemical and environmental degradation of a deposition unit. In certain embodiments, a surface of the deposition unit can be modified or treated to influence the activity of the fluid and compounds within the fluid, to influence the hydrophilic/hydrophobic properties, lipophilic/lipophobic properties, ionic properties, and/or influence the surface tension. Such modifications can, for example, facilitate the ability to control the volume of fluid deposited on a support, the reproducibility of the volume of fluid deposited on a support, and/or enhance the long-term performance of a deposition unit.

In certain embodiments, the physical, chemical, and/or electrical properties of a deposition unit can be modified only at the proximate end. In certain embodiments, such modification can be useful for controlling the volume of fluid deposited onto a support, for controlling the reproducibility of the volume of fluid deposited onto a support, and/or for enhancing the long-term performance of the deposition unit.

In certain embodiments, the cross-sectional shape of a deposition unit can be any appropriate shape. For example, a deposition unit can have a circular cross-section such that the deposition unit is in the form of a fiber, capillary tube, pin, filament, or wire.

In certain embodiments, a deposition unit can be flexible or rigid. In certain embodiments, the mechanical properties of a deposition unit can be consistent throughout the length, or can be different in certain defined sections of the deposition unit. In certain embodiments, flexibility can facilitate the ability of a deposition unit to accommodate tolerance variations during the printing process. In certain embodiments, multiple deposition units can be displaced a different axial distance before the proximate end of deposition unit nears or contacts a support. In certain embodiments, a variation in an axial displacement difference can arise from a variety of factors including, for example, non-planarity between the printing manifold and the support, differences in the relative position of the proximate ends of the deposition units, and/or non-planarity of the support upon which fluid is deposited. In certain embodiments, a flexible deposition unit can accommodate axial displacement tolerance variations by bending when pressed onto a support.

An appropriate diameter of a deposition unit can at least in part be determined such that fluid flow through a channel can be prevented or reduced in the absence of moving the deposition unit associated with the channel. In certain embodiments, a deposition unit can have a diameter ranging from 25 µm to 1,000 µm. In certain embodiments, a deposition unit can have a diameter of less than 200 µm. In certain embodiments, a deposition unit can have a diameter of less than 100 µm. For example, in certain embodiments, the diameter of a deposition unit can range from 10 µm to 500 µm less than the dimensions of the channel in which the deposition unit is disposed.

In certain embodiments, the proximate end of a deposition unit can be any appropriate shape including, for example, concave, flat, convex, or formed so as to have a definite shape and/or so as to include a certain feature. In certain embodiments, the proximate end of a deposition unit can transfer fluid from a channel to a support. In certain embodiments, the proximate end can physically contact the support during the deposition process. As such, it can be useful to chemically and/or physically modify a proximate end of a deposition unit to facilitate fluid transfer, to control fluid transfer, and/or to enhance the physical robustness of proximate end of the deposition unit.

In certain embodiments, the distal end of a deposition unit can be operatively coupled to a mechanism configured to move the deposition unit. A deposition unit can be physically connected to a mechanism configured to move, or can be coupled by a non-physical means, such as for example, acoustically. In certain embodiments, multiple deposition units can be coupled to a single mechanism configured to move. In certain embodiments, a single deposition unit can be coupled to a single mechanism configured to move. In certain embodiments, multiple deposition units can be moved at the same time. In certain embodiments, multiple deposition units can be moved at different times.

FIG. 1 illustrates certain embodiments in which multiple deposition units 21 can be moved at the same time by a single mechanism 30 configured to move at least one of the deposition units 21. Deposition units 21 can be held by at least one device 22. Deposition units 21 can be retained by device 22 using retention features 24 such as, but not limited to, gaskets, ferrules, grommets, sleeves, diaphragms, and the like.

Although FIG. 1 illustrates deposition units 21 parallel throughout the length of channel 15, in certain embodiments, deposition units 21 can be positioned at an angle with respect to the longitudinal axis of channels 15. In certain embodiments, deposition units 21 can be bundled and operatively coupled to mechanism 30 configured to move (not shown).

As illustrated in FIG. 1, in certain embodiments, device 22 can be movable with respect to plates 18 such that proximate ends 19 of deposition units 21 can be moved in and out of proximate ends 29 of channels 15. In certain embodiments, when fully extended proximate ends 19 of deposition units 21 can physically contact support 25. In certain embodiments, fluid retained on proximate ends 19 of deposition units 21 can contact the surface of support 25.

As illustrated in FIG. 1, mechanism 30 configured to move can be operatively coupled to device 22. Mechanism 30 configured to move can move device 22 thereby causing deposition units 21 to move within channel 15. Mechanism 30 configured to move can include, for example, an activator that is moveable between two positions such as a linear or vertical actuator, or the like. Examples of suitable actuators further include, for example, solenoids, pneumatic actuators, hydraulic actuators, magnetostrictive actuators, piezoelectric actuators, acoustic actuators, and motor assemblies.

In certain embodiments (not shown), distal ends 23 of deposition units 21 can be bundled together and the bundle of deposition units 21 operatively coupled to mechanism 30 configured to move.

In certain embodiments, the deposition units can be independently addressable. "Independently addressable" means that the movement of at least a subset of the deposition units, and in certain embodiments, each deposition unit, can be controlled by a separate mechanism configured to move. In certain applications, such as for example, in combinatorial chemistry and synthetic biochemical applications, it can be useful to control the deposition of certain reagents at specific areas on a support. For embodiments in which the deposition units are independently addressable, a mechanism configured to move can include MEM (microelectromechanical) actuators, acoustic actuators, as well as other actuators disclosed herein.

In certain embodiments, in addition to axially positioning the deposition units, a mechanism configured to move can oscillate the deposition units. In such embodiments, a mechanism configured to move can include a mechanism configured to oscillate, or in certain embodiments a mechanism configured to oscillate can be independent of mechanism configured to move and can be independently connected to the deposition units (not shown). A mechanism configured to oscillate can comprise, for example, an oscillation unit having a control unit for determining the oscillation amplitude, frequency, and time an oscillatory motion is applied to the deposition units, and thereby control the amount of fluid deposited onto a support. A mechanism configured to oscillate can include any device capable of oscillating deposition units in a controlled manner. Certain oscillating units can include, for example, solenoids, motors, and pneumatic, hydraulic, magnetostrictive, acoustic or piezoelectric actuators. In certain embodiments, the mechanism configured to oscillate can produce an oscillation frequency ranging from 10 Hz to 100 Hz. In certain embodiments, a mechanism configured to oscillate can produce an oscillation amplitude at the proximate end of a deposition unit ranging from 10 µm to 100 µm.

In certain embodiments, an apparatus for depositing fluid can be mounted on a horizontal positioning system. For example, the apparatus illustrated in FIG. 1 can be mounted on an X-Y positioner to facilitate translation of the apparatus within the horizontal plane of support 25. The ability to translate the apparatus within the horizontal plane of support 25 can facilitate deposition of fluid 60 onto support 25 at a density greater than that provided by printing manifold 11 comprising a plurality of deposition units 21. As an example, for a separation between adjacent deposition units 21 of 1,000 μm, printing manifold 11 can be moved in either the X direction, the Y direction, or in the X-Y direction, by a controlled distance prior to deposition of a subsequent fluid area 27 onto support 25. In this way, the density of distinguishable fluid areas 27 on support 25 can be greater than the density of deposition units 21 comprising printing manifold 11. The density of distinguishable fluid areas 27 deposited on support 25 can at least in part be determined by the dimensions of the fluid area 27 when initially deposited on support 25. In certain embodiments, the diameter of fluid area 27 on support 25 can be 100 μm or less. In certain embodiments, surface features can reduce the effective size of positionally distinguishable areas on support 25. For example, support 25 can include wells, absorptive features such as porous areas, and/or areas having designed surface tension properties. In certain embodiments, translation of printing manifold 11 within the plane of the surface of support 25 can be accomplished using a robotic assembly, or the like.

In certain embodiments, the printing manifold can remain fixed, while the support can be translated horizontally. In certain embodiments, the support can further be moved vertically to bring the support surface in contact with the printing units or in contact with fluid disposed on the proximate end of the printing units.

In certain embodiments, a support can comprise any appropriate material as well as exhibit any appropriate physical, chemical, and/or electrical properties. In certain embodiments, a support can be flexible or rigid. A flexible support can be distorted and includes, for example, membranes, polymer films, metallic films, and polymeric matrices. Flexible polymer films include, but are not limited to, polyamide such as nylon, nitrocellulose, polypropylene, polyimide, and polyester films. Rigid supports can be fabricated from a number of materials including, but not limited to, silicon, silica, polymers, and metals. In certain embodiments, useful polymers can include any engineering thermoplastic and/or thermoset material. Exemplary plastics include, for example, polytetrafluoroethylene, polyamide, polypropylene, polystyrene, polyimide, and polycarbonate. The material used to form a support can include dopants and fillers, and can be a composite material. Examples of useful metals include gold and platinum.

In certain embodiments, the surface of a support can be modified to impart any desirable physical, chemical, or electrical properties to the surface. The surface of a support can comprise at least one film or layer applied to at least a portion of the surface by methods known in the art such as for example, by means of printing or lithography. In certain embodiments, the layer can exhibit homogenous topographical, physical and/or chemical properties, or can exhibit heterogeneous topographical, physical and/or chemical properties. In certain embodiments, the layer can be applied to impart at least one physical property such as planarity or non-planarity, to impart at least one chemical property such as hydrophobicity/hydrophilicity, lipophobicity/lipophilicity, ionic property, and/or to impart at least one electrical property such as conductivity. In certain embodiments, the surface attributes can be combined or can be localized.

The surface of a support can comprise any desired physical characteristics. For example, the surface can be smooth or planar, can have irregularities or a specific controlled topography, or can be porous. Surface topography can be created by methods known to those skilled in the art and can include lithographic methods and other methods used, for example, in the electronics industry. In certain embodiments, the surface of a support can have raised features, can have recessed features, and/or a combination of both raised and recessed features. The features can be porous or non-porous and can be the same or different material composition as the adjoining material. The surface features can be formed using the same or different materials. For example, the surface can include a glass support upon which is plated, deposited and/or etched electrically conductive and non-conducting patterns.

In certain embodiments, the surface of a support can be modified to comprise at least one film having a thickness ranging from, for example, 0.001 mm to 1 mm, which can impart certain properties to the surface. In certain embodiments, the layers can be for the purpose of planarizing the surface or for imparting certain desirable properties such as hydrophobicity/hydrophilicity. Layers for modification can include inorganic and organic layers such as metals, metal oxides, conformal silica or glass coatings, polymers, or small organic molecules. Polymeric layers include, but are not limited to, layers of peptides, proteins, polynucleic acids or mimetics thereof, e.g. peptide nucleic acids and the like; polysaccharides, phospholipids, polyurethane, polyesters, polycarbonates, polyureas, polyamides, polyethyleneamines, polyarylene sulfides, polysiloxanes, polyimides, and polyacetates. In certain embodiments, a surface can include target or probe molecules, polymers, ligands, surfactants, lipids, biopolymers, polysaccharides, and the like, that may or may not be immobilized on the surface.

Various embodiments can be used to deposit any appropriate fluid onto a support. In certain embodiments, apparatus can deposit a single fluid on a support or can deposit more than one fluid on a support. In certain embodiments, the fluid in each channel can be the same, in certain embodiments, the fluid in more than one channel can be the same, and in certain embodiments, the fluid in each of the plurality of channels can be a different fluid.

In certain embodiments, fluid can be an aqueous or non-aqueous liquid and can contain at least one compound to be deposited on support. The compound can be any appropriate compound including, but not limited to, small molecules, polymers, macromolecules, and biomolecules. The term "polymer" as used herein refers to any compound that is made up of two or more monomeric units covalently attached to each other, where the monomeric units are the same or different, such that the polymer can be a homopolymer or heteropolymer, respectively. Exemplary polymers include, but are not limited to, polymers having biological significance such as oligonucleotides, polynucleotides, oligonucleotide probes, polynucleotide probes, modified oligonucleotides and polynucleotides, synthetic oligonucleotides and polynucleotides, oligopeptides, polypeptides, proteins, enzymes, and polysaccharides. A polymer can be naturally occurring or synthetic. The term "polypeptide" as used herein refers to a polymer having at least two amino acids linked by amide linkages. The term "biomolecule" as used herein refers to an organic molecule and especially a macromolecule such as a protein or nucleic acid in living organisms. As used herein, the terms "polynucleotide," "oligonucleotide," and "nucleic acid" are used interchangeably and include, for example, single-stranded and double-stranded polymers of nucleotide monomers, including 2'-deoxyribonucleotides (DNA) and ribonucleotides (RNA) linked by internucleotide phosphodiester bond linkages, or internucleotide analogs, and associated counter ions, e.g., $H^+$, $NH_4^+$, trialkylammonium, $Mg^{2+}$, $Na^+$, and the like. The term "nucleotide," as used herein, refers to a compound comprising a nucleotide base linked to the C-1' carbon of a sugar molecule, such as ribose, arabinose, xylose, and pyranose, and sugar analogs thereof. The term nucleotide also encompasses nucleotide analogs. The term "nucleotide analog", as used herein, refers to embodiments in which the pentose sugar and/or the nucleotide base and/or one or more of the phosphate esters of a nucleotide may be replaced with a respective analog. The nucleotide monomer units may comprise any of the nucleotides described herein, including, but not limited to, naturally occurring nucleotides and nucleotide analogs such as peptide nucleic acid monomers and locked nucleic acid monomers.

A nucleic acid may be composed entirely of deoxyribonucleotides, entirely of ribonucleotides, or chimeric mixtures thereof. Nucleic acids typically range in size from a few monomeric units, e.g. 5-60 when they are sometimes referred to in the art as oligonucleotides, to thousands of nucleotide units. Nucleic acids include, but are not limited to, genomic DNA, cDNA, hnRNA, mRNA, rRNA, tRNA, fragmented nucleic acid, nucleic acid obtained from subcellular organelles such as mitochondria or chloroplasts, and nucleic acid obtained from microorganisms or DNA or RNA viruses that may be present on or in a biological sample. Nucleic acids include, but are not limited to, synthetic and in vitro transcription products. Nucleic acids may be composed of a single type of sugar moiety, e.g., as in the case of RNA and DNA, or mixtures of different sugar moieties, e.g., as in the case of RNA/DNA chimeras.

In certain embodiments, for example, wherein the apparatus and methods can be used to prepare oligonucleotide microarrays, the fluid can comprise at least one of oligonucleotides and/or polynucleotides.

In certain embodiments, the volume of fluid deposited onto a support can be determined by a number of factors including, for example, the surface tension of the fluid, the dimensions and physical and chemical properties of the proximate end of the deposition unit, the dimensions of the channel and/or the printing channel with respect to the dimensions of the deposition units, the viscosity of the fluid, and/or the dynamics of the motion of the deposition unit during the deposition process. In certain embodiments, the volume of fluid deposited onto a support can range from 2 picoliters to 5 nanoliters.

Figure 3:
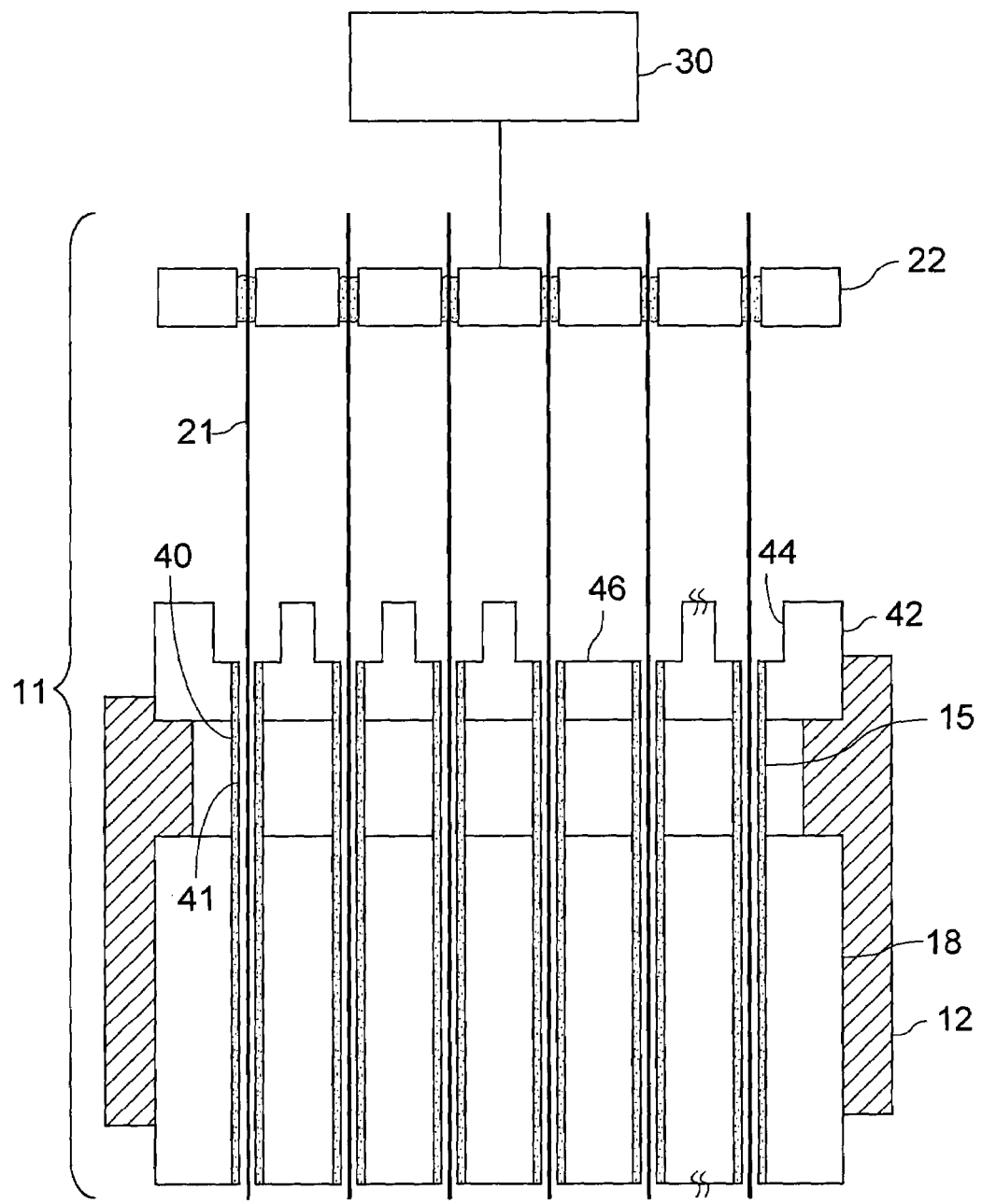
FIG. 3 is a schematic illustration of an apparatus for depositing fluid onto a support according to certain embodiments.

Certain embodiments of an apparatus are schematically illustrated in FIG. 3. FIG. 3 shows printing manifold 11, and mechanism 30 configured to move a plurality of deposition units 21 wherein deposition units 21 can be disposed within a capillary tube 40, each capillary tube 40 being disposed within one of the plurality of channels 15. The term "capillary tube" refers to a slender structure defining an internal volume, such as, for example a tube. A capillary tube 40 can be disposed within each channel 15. In certain embodiments, capillary tubes 40 can extend the length of channel 15. In certain embodiments, for example, wherein channels comprises reservoir channel and a printing channel, capillary tubes can be disposed within the reservoir channel, the printing channel, or both the reservoir channel and the printing channel.

In certain embodiments, a capillary tube can have any appropriate cross-sectional shape. Capillary tubes having circular cross-section are commercially available. In certain embodiments, wherein a capillary tube has a circular cross-section, the capillary tube has an inner and outer diameter. In certain embodiments, the appropriate outer diameter of a capillary tube can be in part determined by the dimensions of a channel and can be selected to fit within a channel. In certain embodiments, the inner diameter of a capillary tube can be dimensioned to prevent fluid flow through a channel in the absence of moving the deposition unit associated with the channel, as disclosed herein. For example, a capillary tube can have an inner diameter ranging from 10 μm to 200 μm greater than the diameter of a deposition unit associated with the capillary tube.

A capillary tube can be rigid or flexible and can comprise any appropriate material such as glass, silica, quartz, metal, or polymer. The surfaces of a capillary tube can be modified to impart and/or optimize a useful physical, chemical, and/or electrical property. In certain embodiments, the appropriate dimensions of a capillary tube can be determined by factors such as the dimensions of a channel, the dimensions of a deposition unit, the physical and chemical characteristics of the surfaces in contact with a fluid, the physical and chemical characteristics of fluid, and/or the amount of fluid to be transferred to a support.

In certain embodiments, a capillary tube can be immobilized within a channel using any appropriate method. For example, a capillary tube can be press-fit into a channel, can be insert molded, or can be immobilized using a compound such as an adhesive.

The volume determined by the difference between the outer surface of a deposition unit and the inner diameter of a capillary tube can serve as a fluid reservoir. In certain embodiments, as shown in FIG. 3, capillary tube 40 can be fluidly coupled to a separate fluid reservoir 42. As shown in FIG. 3, fluid reservoir 42 can be a multiwell plate having individual fluid wells 44, or coupled fluid wells 46 fluidly coupled to capillary tubes 40. Coupled fluid well 46 can provide the same fluid to more than one channel 15. Fluid reservoir 42 can be fixedly or removeably attached to capillary tubes 40, and/or can be physically coupled to plates 18 such as with a mounting bracket or fixture 12, as shown, or can be physically separate.

As shown in FIG. 3, deposition units 21 can be disposed within capillary tubes 40. Deposition units 21 can be dimensioned with respect to the inner surface 41 of capillary tube 40 to be moveable therein. Deposition units 21 can be operatively coupled to mechanism 30 configured to move by device 22. In certain embodiments, deposition units 21 can be independently addressable.

In certain embodiments, disposing a capillary tube within a channel can be useful in that the dimensions of the channel in which the capillary tube is disposed can be large, for example, from 100 μm to 1,000 μm and thereby can facilitate channel and/or plate fabrication using high volume, cost-effective manufacturing methods such as plastic molding, and micro-ESD machining. In certain embodiments, such manufacturing methods can be used to produce precisely located grooves, slots or channels into which a capillary tube can be disposed. Since the capillary tubes can be fabricated to have precise and well-controlled dimensions, in certain embodiments, the dimensions of the grooves, slots or channels in which the capillary tube is disposed can have a more relaxed tolerance. Regardless of the dimensions of the outer diameter of capillary tube, the inner diameter of a capillary tube can be determined such as to prevent fluid flow through a capillary tube in the absence of moving a deposition unit associated with the capillary tube. For example, the inner diameter of a capillary tube can range from 10 μm to 100 μm greater than the diameter of a deposition unit.

Figure 4:
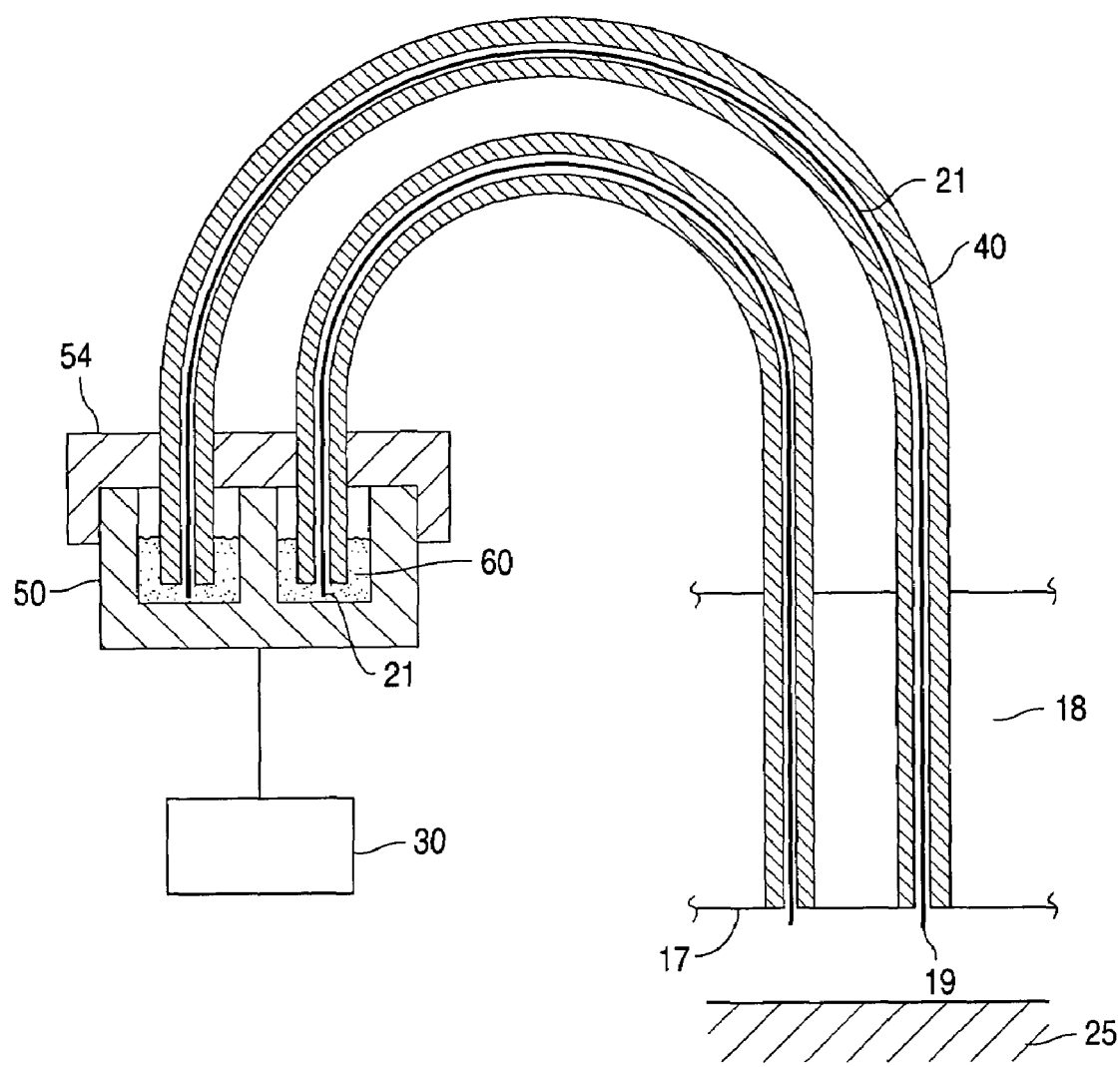
FIG. 4 is a schematic illustration of an apparatus for depositing fluid onto a support according to certain embodiments.

Certain embodiments of apparatus are illustrated in FIG. 4. FIG. 4 shows an apparatus in which capillary tubes 40 can be flexible such that there is fluid coupling to a remote fluid reservoir 50. Remote fluid reservoir 50 can include multiple reservoirs in the form of, for example, wells, tubes, microfluidic compartments, columns, and the like.

As shown in FIG. 4, deposition units 21 can be disposed within flexible capillary tubes 40. Deposition units 21 can be physically connected to the housing 54 of remote reservoir 50. In certain embodiments, fluid 60 within remote reservoir 50 can be drawn into capillary tube 40 by capillary forces or fed into capillary tube 40 using pressure. In certain embodiments, remote reservoir 50 can be operatively connected to mechanism 30 configured to move which, when activated, can cause proximate ends 19 of deposition units 21 to extend beyond the proximate surface 17 of plate 18 to deposit fluid onto support 25.

Figure 5A:
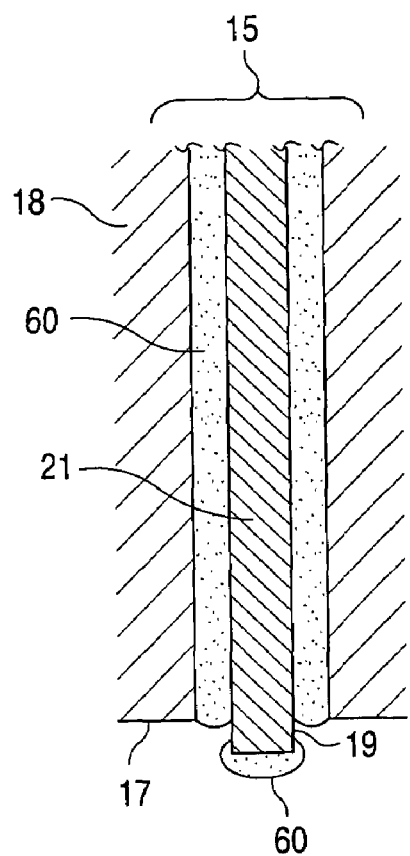
FIGS. 5A and 5B are schematic illustrations of a deposition unit associated with a channel for depositing fluid onto a support according to certain embodiments.
Figure 5B:
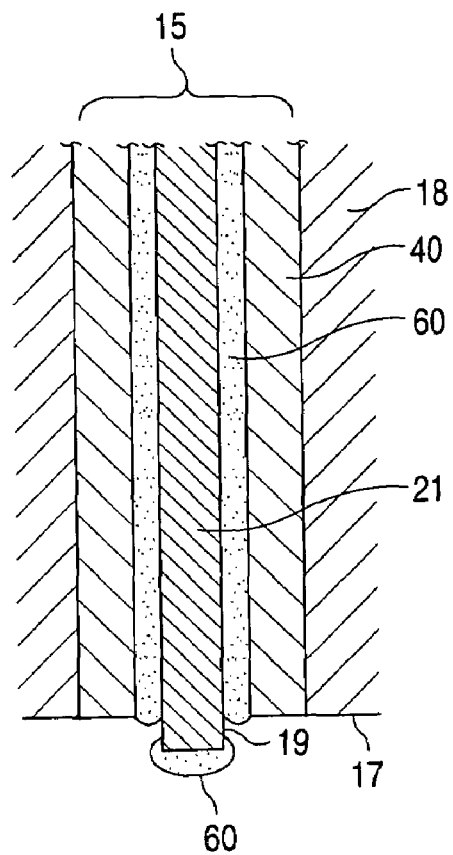

FIGS. 5A and 5B show schematic illustrations of proximate end 19 of deposition unit 21 and plate 18. FIG. 5A shows a schematic illustration of certain embodiments in which deposition unit 21 is disposed within channel 15 comprising fluid 60. FIG. 5B shows a schematic illustration of certain embodiments of deposition unit 21 disposed within capillary tube 40 wherein capillary tube 40 is disposed within channel 15. In FIG. 5A and FIG. 5B proximate end 19 of printing unit 21 is shown extending beyond the proximate surface 17 of plate 18 and retaining a portion of fluid 60.

In certain embodiments, a printing manifold can include a plurality of plates. In certain embodiments, the plates can be fabricated to include a plurality of channels as separate units and stacked or assembled to form a printing manifold. The deposition units can be placed within the plurality of channels prior to assembly of the printing manifold, or can be inserted into the channels after multiple plates are assembled and secured. In a similar manner, in certain embodiments comprising capillary tubes disposed within the channels, the capillary tubes can be located within the channels prior to or following assembly of the multiple plates. In certain embodiments, the deposition units can be inserted into the capillary tubes at any stage of the assembly process as appropriate. Assembly of the printing manifold can be by any appropriate method and can be manual or automated.

Figure 6A:
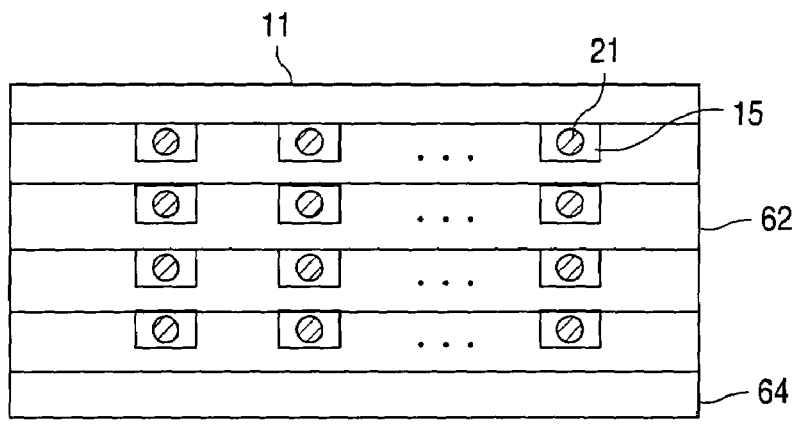
FIGS. 6A, 6B, and 6C are schematic illustrations of a printing manifold comprising a plurality of plates according to certain embodiments.
Figure 6B:
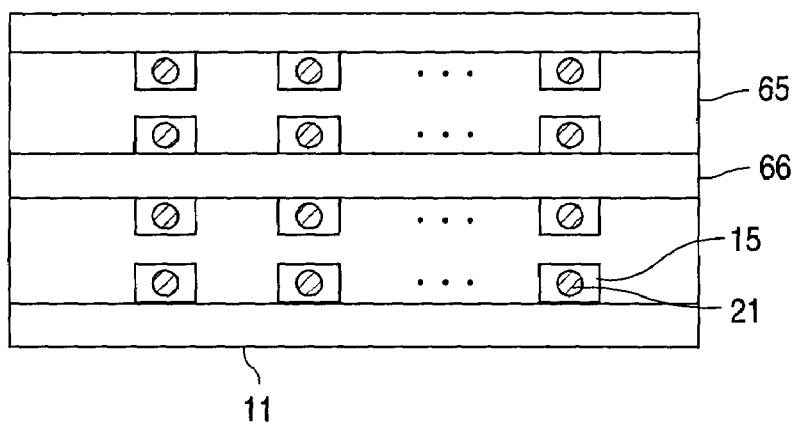
Figure 6C:
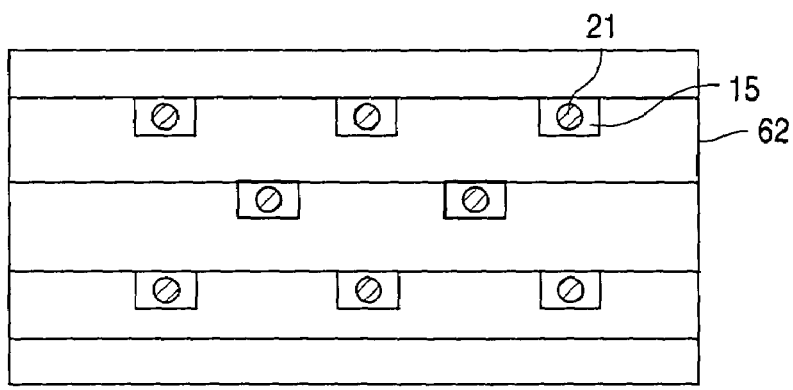

FIGS. 6A, 6B, and 6C illustrate embodiments of printing manifold 11 comprising a plurality of plates. FIG. 6A shows a plurality of plates 62 and end plates 64. Plates 62 comprise a plurality of channels 15 located at a regular interval along a single surface of plates 62. In certain embodiments, wherein fluid areas are to be deposited, for example, on a 1,000 μm grid array, it can be appropriate to use 1,000 μm thick plates 62 having a center-to-center spacing between channels 15 of 1,000 μm. Deposition units 21 are shown disposed within plurality of channels 15.

In certain embodiments of printing manifold 11, as shown in FIG. 6B, a plurality of plates 65 can have channels 15 formed on both sides of alternate plates 65. Deposition units 21 are shown disposed within plurality of channels 15. Intermediate plates 66 can be located between plates 65 comprising channels 15, for example, to maintain a constant pitch of channels 15, or to provide a surface with physical, chemical, and/or electrical properties different from those of alternate plates 65. In certain embodiments, adjoining plates 65 and 66 having different physical material properties can enhance, for example, fluidly sealing channels 15 or otherwise controlling deposition of fluid.

In certain embodiments of printing manifold 11, as shown in FIG. 6C, plates 62 can include channels 15 in which are disposed deposition units 21 displaced relative to adjoining plates. In certain embodiments, other arrangements of channels can be designed and fabricated as appropriate for a particular application. For example, the channels and associated deposition nits can be located in an irregular pattern. In certain embodiments, a printing manifold can include regions in which the channels and associated deposition units are located on a certain grid, with other regions having a different grid, and/or other regions wherein the channels and associated deposition units are irregularly located.

In certain embodiments, the number of channels and deposition units comprising a printing manifold can range from 50 to 30,000. In certain embodiments, the number of channels and deposition units comprising a printing manifold can range from 96 to 12,288.

In certain embodiments, the multiple plates forming a printing manifold can be secured by a frame. Use of a detachable frame in contrast to the use of a mechanism to permanently attach adjoining plates, such as by adhesion, can facilitate disassembly of printing manifold and reuse of plates. In certain embodiments, the printing manifold can also be disposable.

Certain embodiments provide methods of depositing fluid on a support comprising providing a fluid to at least one of a plurality of channels in an apparatus comprising a printing manifold comprising (i) a plurality of adjoining plates, each plate comprising a first surface, a second surface, and a plurality of channels, wherein each channel intersects the first and second surfaces; and (ii) a plurality of deposition units, wherein each deposition unit is disposed within a different channel of the plurality of channels such that each deposition unit is configured to move fluid from the channel with which the deposition unit is associated through the second surface of one of the plates, and moving at least one of the plurality of deposition units associated with a channel comprising the fluid to deposit fluid on the support.

Certain embodiments provide methods of depositing fluid on a support comprising providing a fluid to at least one of a plurality of capillary tubes in a printing manifold comprising: (i) at least one plate comprising a first surface, a second surface and a plurality of channels, wherein each channel intersects the first and second surface; (ii) the plurality of capillary tubes, each capillary tube being disposed within a different capillary tube of the plurality of capillary tubes; and (iii) a plurality of deposition units, each deposition unit being disposed within a different capillary tube of the plurality of capillary tubes such that each deposition unit is configured to move fluid from the capillary tube with which the deposition unit is associated through the second surface of one of the plates; and moving at least one of the plurality of deposition units associated with a capillary tube comprising the fluid to deposit fluid on the support.

In certain embodiments, fluid can be added to at least one channel by, for example, pipetting. In certain embodiments, fluid can be transported to the channel from a remote fluid reservoir by, for example, capillary action or by pressure.

In certain embodiments, to deposit fluid on a support, a printing manifold can be positioned with respect to a support by translating a printing manifold, translating a support, or by translating both the printing manifold and the support. In certain embodiments, a support can be translated with respect to a printing manifold such as by using an X-Y positioning system. For embodiments where a support comprises a plurality of positionally distinguishable areas, as defined for example, topographically, chemically, physically and/or electronically, the support can be accurately aligned with respect to the plurality of deposition units comprising a printing manifold. In certain embodiments, a printing manifold can be aligned with the support, for example, by aligning light transmitted from at least one optical fiber inserted within at least one of the channels. In certain embodiments, other non-contact and contact methods for precision alignment can be used, such as for example, optical robotic methods, electronic methods, and mechanical methods.

In certain embodiments, the proximate face of a printing manifold can be located from 1 mm to 10 mm above the surface of a support during fluid deposition.

In certain embodiments, following alignment of the printing manifold and the support, the deposition units can be axially moved toward a support to deposit fluid on the support.

In certain embodiments, the proximate ends of the deposition units can contact the surface of the support. Non-planarity among the plurality of deposition units and/or non-planar support topographies can be accommodated by flexure of the deposition units upon application of an axially compressive force to the deposition units upon contacting a support. In certain embodiments, the fluid retained on the proximate ends of the deposition units can contact the support. Upon retracting the deposition units from the support, a plurality of fluid areas can remain on the support surface. The rate at which the deposition units are raised and lowered within the channels to deposit fluid onto the support can be any appropriate rate. In certain embodiments, since fluid is fed to the proximate end of a deposition unit while the proximate end of a deposition is positioned within the associated channel, successive printing cycles can be rapid, for example, the rate at which fluid areas can be deposited on the support can be high. For example, in certain embodiments, the rate of the printing process can range from 1 Hz to 10 Hz.

In certain embodiments, the volume of fluid transferred to the support can be determined by a number of factors including the dimensions channel, the dimensions of the deposition unit, the physical, chemical, and/or electrical properties of the proximate end of the channel and the deposition unit, the rate at which deposition unit is activated, the frequency and time deposition unit is oscillated, and/or the physical, chemical and/or electrical properties of the support. In certain embodiments, the volume of fluid deposited on the support can range from 20 picoliters to 100,000 picoliters, in certain embodiments from 50 picoliters to 50,000, and in certain embodiments from 100 picoliters to 5,000 picoliters.

In certain embodiments, following deposition of a pattern of fluid areas on a support, the support can be repositioned and a subsequent pattern of spots deposited on the same support. This printing process can be repeated. In certain embodiments, after a certain number of fluid areas are deposited on a single support, a new support can be moved into place beneath the printing manifold, and aligned, using for example, robotics. A pattern of fluid areas can then be deposited on the new support during subsequent printing cycles.

Figure 7:
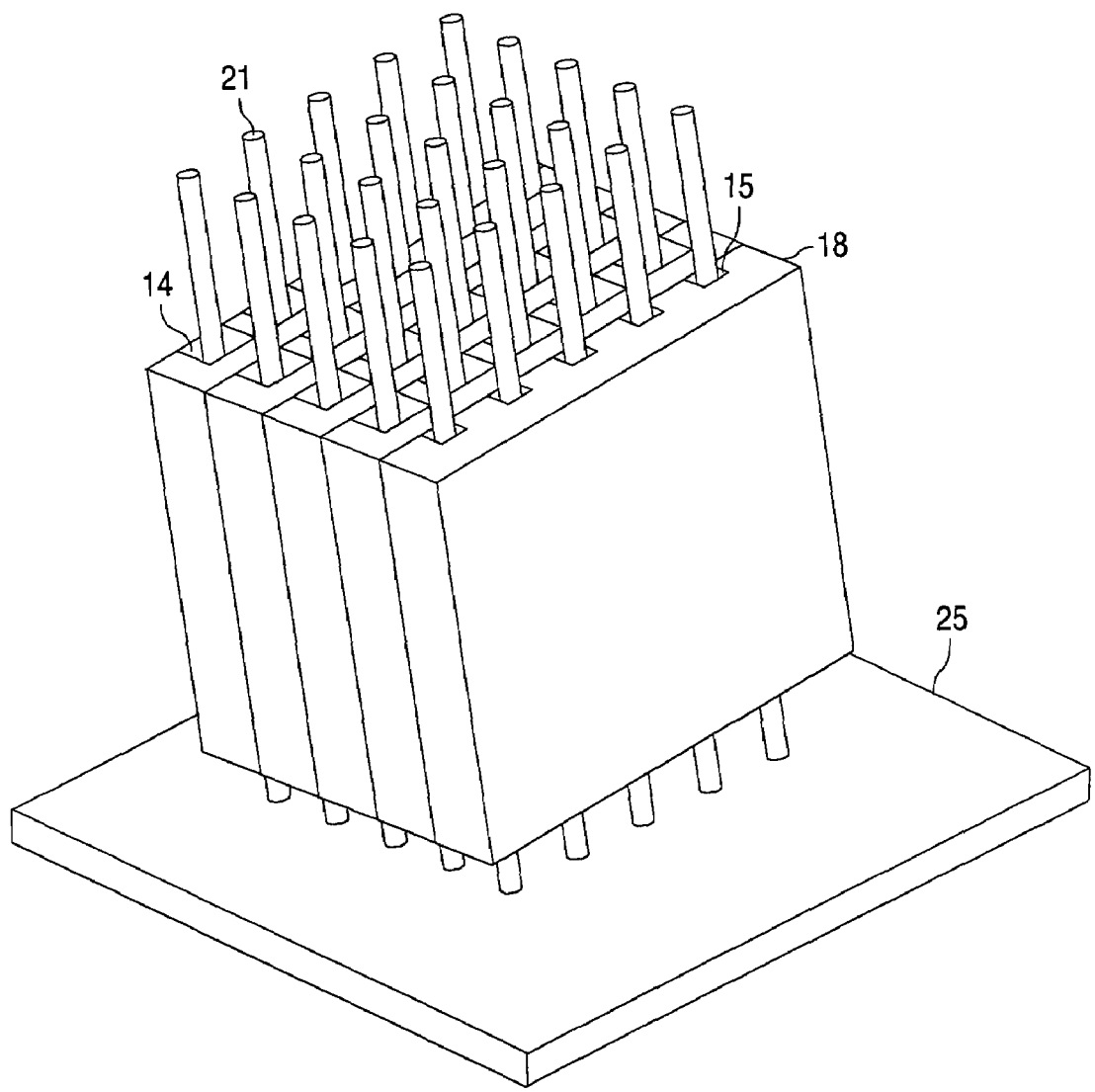
FIG. 7 is a schematic illustration of a printing manifold according to certain embodiments.

Embodiments illustrated in FIGS. 1 through 6 show deposition units and channels oriented perpendicular to the support. It will be appreciated that in certain embodiments, the deposition units can contact the support at an angle. FIG. 7 illustrates certain embodiments wherein a printing manifold comprising multiple plates 18 comprising a plurality of channels 14, 15 can facilitate non-perpendicular contact of the deposition units 21 with support 25.

As can be appreciated, in certain embodiments, methods are amenable to high throughput fabrication of microarrays comprising a plurality of positionally distinguishable areas and/or molecules, such as for example, oligonucleotide microarrays.

In certain embodiments, apparatus and methods can be used to produce arrays comprising a plurality of positionally distinguishable areas. Various uses of certain microarrays include, but are not limited to, gene expression analysis, drug screening, nucleic acid sequencing, and mutation analysis.

In certain microarrays, it can be useful to deposit up to tens of thousands of fluid samples onto a single support. For example, i.e., in certain embodiments, a microarray surface can be patterned with positionally distinguishable porous areas having a diameter of 5 μm (micrometer). In certain embodiments, the 5-μm diameter area can be filled with a composition supplied from a fluid droplet having an initial diameter of, for example, 100 μm. Thus, in certain embodiments, at a 5 μm pitch, a 1 square inch microarray surface can potentially accommodate up to 60,000 distinguishable areas.

In certain embodiments, fabrication of high-density microarrays can be accomplished in an efficient manner. For example, in certain embodiments, a print head comprising 32, 1,000 μm thick plates, wherein each plate comprises 48 channels having a center-to-center spacing of 1,000 μm can have the ability to deposit up to 1,536 positionally distinguishable fluid areas, or spots, simultaneously, on a 1,000 μm pitch array. In certain embodiments, during subsequent deposition operations, either the printing manifold or the support can be translated in the horizontal plane to reposition the support with respect to the printing manifold and the array of deposition units. In certain embodiments, it can be useful to reposition and/or translate the support and/or printing manifold by a distance ranging from 50 μm to 500 μm prior to depositing a subsequent fluid area or spot.

In certain embodiments, the volume of fluid retained by a channel can at least in part be determined by the dimension of the channel and/or the deposition unit. The following estimate of fluid volume is based on a channel comprising a 1 cm-long, 200 μm-wide deposition channel and a 1 cm-long, 800 μm-wide reservoir channel, and a 100 μm-diameter deposition unit. The volume of fluid within deposition channel is approximately 0.4 μL and the volume of fluid within reservoir channel is approximately 1.6 μL for a total volume of 2 μL retained by each channel. Assuming that 1 nL of fluid is deposited for each fluid area, each channel can retain sufficient fluid to deposit about 2,000 fluid areas onto a support. Each additional cm length of reservoir channel can hold an additional 1.6 μL of fluid such that an additional 1,600 fluid areas can be deposited onto a support.

In certain embodiments, supports having fluid deposited thereon are provided, wherein the fluid is deposited using apparatus and/or methods described herein. In certain embodiments, the fluid areas can be deposited on a regular array of positionally distinguishable areas on a grid having a pitch ranging from 50 μm to 2,000 μm. In certain embodiments, the supports can comprise any of those disclosed herein. Further, the support on which the fluid is deposited can have any appropriate dimension. In certain embodiments, the support having fluid deposited thereon can comprise an array of biomolecules, including, for example, an oligonucleotide array, a polynucleotide array, and a protein array.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A printing manifold for depositing fluid for chemical and biological analysis on a support comprising:
 a plurality of adjoining plates, each plate comprising a first surface, a second surface;
 a plurality of channels intersecting the first and second surface of each plate, wherein the dimension of the first and second surface of each plate perpendicular to the direction of the plurality of channels ranges from 200 micrometers to 10,000 micrometers; and
 a plurality of deposition units, said deposition units formed from a solid material, wherein each deposition unit extends at least between a proximate end and a distal end of the channel with which the deposition unit is associated, and wherein the proximate end of each deposition unit is configured to retain fluid for chemical and biological analysis from the channel with which the deposition unit is associated and to deposit said fluid on the support to produce an array comprising a plurality of positionally distinguishable areas.

2. The printing manifold of claim 1, wherein the printing manifold comprises from 1 to 100 plates.

3. The printing manifold of claim 1, wherein the printing manifold comprises from 50 to 30,000 channels.

4. The printing manifold of claim 1, wherein each plate comprises from 10 to 100 channels.

5. The printing manifold of claim 1, wherein the clearance between the walls of each channel and the outer surface of the deposition unit associated therewith is less than 25 micrometers.

6. The printing manifold of claim 1, wherein the center-to-center distance between nearest channels ranges from 200 micrometers to 10,000 micrometers.

7. The printing manifold of claim 1, wherein the center-to-center distance between nearest channels ranges from 200 micrometers to 1,000 micrometers.

8. The printing manifold of claim 1, wherein at least one of the plurality of channels further comprises a reservoir channel.

9. The printing manifold of claim 8, wherein the width of the reservoir channel ranges from 50 micrometers to 4,000 micrometers.

10. The printing manifold of claim 1, wherein the structure of the deposition units formed from a solid material is selected from fiber, filament, and wire.

11. The printing manifold of claim 1, wherein the deposition units are formed from a solid material selected from silicas, metals, and polymers, and combinations thereof.

12. The printing manifold of claim 1, further comprising a capillary tube disposed within at least one of the plurality of channels, wherein the volume determined by the difference between the outer surface of a deposition unit and the inner diameter of a capillary tube serves as a fluid reservoir.

13. The printing manifold of claim 1, wherein the fluid for chemical and biochemical analysis contains a compound selected from small molecules, polymers, macromolecules, and biomolecules.

14. An apparatus for depositing fluid for chemical and biological analysis on a support for comprising:
 a printing manifold comprising:
  a plurality of adjoining plates, each plate comprising a first surface, a second surface;
  a plurality of channels intersecting the first and second surface of each plate, wherein the dimension of the first and second surfaces perpendicular to the direction of the plurality of channels ranges from 200 micrometers to 10,000 micrometers; and
  a plurality of deposition units, said deposition units formed from a solid material, wherein each deposition unit extends at least between a proximate end and a distal end of the channel with which the deposition unit is associated, and wherein the proximate end of each deposition unit is configured to retain fluid for chemical and biological analysis from the channel with which the deposition unit is associated and to deposit said fluid on the support to produce an array comprising a plurality of positionally distinguishable areas; and
 at least one mechanism configured to move at least one of the deposition units.

15. The apparatus of claim 14, wherein the printing manifold comprises from 1 to 100 plates.

16. The apparatus of claim 14, wherein the printing manifold comprises from 50 to 30,000 channels.

17. The apparatus of claim 14, wherein each plate comprises from 10 to 100 channels.

18. The apparatus of claim 14, wherein the clearance between the walls of each channel and the outer surface of the deposition unit associated therewith is less than 25 micrometers.

19. The apparatus of claim 14, wherein the center-to-center distance between nearest channels ranges from 200 micrometers to 10,000 micrometers.

20. The apparatus of claim 14, wherein the center-to-center distance between nearest channels ranges from 200 micrometers to 1,000 micrometers.

21. The apparatus of claim 14, wherein at least one of the plurality of channels further comprises a reservoir channel.

22. The apparatus of claim 21, wherein the width of the reservoir channel ranges from 50 micrometers to 4,000 micrometers.

23. The apparatus of claim 14, wherein the at least one mechanism configured to move is configured to displace at least one of the plurality of deposition units longitudinally.

24. The apparatus of claim 14, wherein the at least one mechanism configured to move is configured to oscillate at least one of the plurality of deposition units longitudinally.

25. The apparatus of claim 24, wherein the mechanism is configured to oscillate at a frequency ranging from 10 Hz to 100 Hz.

26. The apparatus of claim 24, wherein the mechanism is configured to displace at least one of the plurality of deposition units a distance ranging from 10 micrometers to 100 micrometers when oscillated.

27. The apparatus of claim 14, wherein the apparatus is configured to deposit from 20 picoliters to 50,000 picoliters on the support.

28. The apparatus of claim 14, further comprising a mechanism configured to position the printing manifold laterally.

29. The apparatus of claim 14, further comprising at least one fluid reservoir fluidly connected to at least one of the plurality of channels.

30. The apparatus of claim 14, further comprising at least one fluid reservoir fluidly connected to at least one of the plurality of channels by a capillary tube.

31. The apparatus of claim 14, wherein the structure of the deposition units formed from a solid material is selected from fiber, filament, and wire.

32. The apparatus of claim 14, wherein the deposition units are formed from a solid material selected from silicas, metals, and polymers, and combinations thereof.

33. The apparatus of claim 14, further comprising a capillary tube disposed within at least one of the plurality of channels, wherein the volume determined by the difference between the outer surface of a deposition unit and the inner diameter of a capillary tube serves as a fluid reservoir.

34. The apparatus of claim 14, wherein the fluid for chemical and biochemical analysis contains a compound selected from small molecules, polymers, macromolecules, and biomolecules.

* * * * *